(12) United States Patent
Birken (10) Patent No.: US 8,469,196 B2
(45) Date of Patent: Jun. 25, 2013

(54) METHOD AND APPARATUS FOR SEPARATING METAL VALUES

(75) Inventor: Stephen Birken, Rexford, NY (US)

(73) Assignee: Wave Separation Technologies, LLC, Rexford, NY (US)

( * ) Notice: Subject to any disclaimer, the term of this patent is extended or adjusted under 35 U.S.C. 154(b) by 66 days.

(21) Appl. No.: 12/500,103

(22) Filed: Jul. 9, 2009

(65) Prior Publication Data
US 2009/0267275 A1    Oct. 29, 2009

Related U.S. Application Data

(60) Division of application No. 10/951,935, filed on Sep. 28, 2004, now Pat. No. 7,571,814, which is a continuation-in-part of application No. 10/080,773, filed on Feb. 22, 2002, now Pat. No. 6,923,328.

(51) Int. Cl.
*B03C 1/30* (2006.01)

(52) U.S. Cl.
USPC ............. 209/40; 209/11; 209/12.1; 209/39; 209/232; 423/27; 34/259

(58) Field of Classification Search
USPC ............. 209/4, 8, 10, 39, 40, 162, 223.1, 209/232, 474, 475, 478, 215; 423/25, 151, 423/152, 27, 150.1; 75/10.13
See application file for complete search history.

(56) References Cited

U.S. PATENT DOCUMENTS

| | | | | |
|---|---|---|---|---|
| 1,011,899 A | * | 12/1911 | Ashcroft | 205/345 |
| 2,341,873 A | * | 2/1944 | Kissock | 423/38 |
| 3,463,310 A | | 8/1969 | Ergun | |
| 3,841,864 A | * | 10/1974 | Rey et al. | 423/140 |
| 3,876,748 A | * | 4/1975 | Roorda et al. | 423/35 |
| 3,959,032 A | | 5/1976 | Koester et al. | |
| 3,961,990 A | | 6/1976 | Koester et al. | |
| 3,976,557 A | * | 8/1976 | Shen et al. | 208/424 |
| 3,979,205 A | * | 9/1976 | Wanzenberg | 75/10.19 |
| 3,992,287 A | | 11/1976 | Rhys | |
| 4,002,463 A | * | 1/1977 | Nestoridis | 75/10.67 |
| 4,125,460 A | * | 11/1978 | Nott et al. | 209/8 |

(Continued)

FOREIGN PATENT DOCUMENTS
GB 1077436 A 7/1967

OTHER PUBLICATIONS

European Search Report for Application No. 03743141.8 dated Dec. 27, 2011.

*Primary Examiner* — Joseph C Rodriguez
(74) *Attorney, Agent, or Firm* — Honigman Miller Schwartz and Cohn LLP (57) ABSTRACT

Methods and apparatuses for separating metal values, such as nickel and nickel compounds, from mineral ores, including lateritic ores are disclosed. The method includes providing a mixture of particles (e.g., crushed and sized ore) that is composed of at least a first group of particles and a second group of particles. Group members have similar chemical composition, while particles belonging to different groups have dissimilar chemical compositions. The mixture of particles is concurrently, or generally concurrently, heated (using microwave/millimeter wave energy) and exposed to a reactant. The wave energy and the reactant act to increase the difference in either the magnetic susceptibility or other separation properties between the first and second group of particles. The mixture of particles is then passed through an appropriate separator to separate the particles of interest. Optional steps are disclosed for purifying selected particles. The reactant includes sulfur, sulfur compounds, halogens, or halogen compounds.

8 Claims, 9 Drawing Sheets

U.S. PATENT DOCUMENTS

| | | | | |
|---|---|---|---|---|
| 4,259,560 A | * | 3/1981 | Rhodes | 219/678 |
| 4,295,881 A | * | 10/1981 | Saville | 75/10.19 |
| 4,311,520 A | | 1/1982 | Kruesi et al. | |
| 4,321,089 A | | 3/1982 | Kruesi et al. | |
| 4,324,582 A | | 4/1982 | Kruesi et al. | |
| 4,339,648 A | | 7/1982 | Jean | |
| 4,511,461 A | | 4/1985 | Kruyer | |
| 4,579,589 A | * | 4/1986 | Yuill et al. | 423/26 |
| 4,585,477 A | * | 4/1986 | Mioen | 75/426 |
| 4,597,487 A | | 7/1986 | Crosby et al. | |
| 4,678,478 A | | 7/1987 | Kelland | |
| 4,751,259 A | | 6/1988 | Roe et al. | |
| 4,762,695 A | | 8/1988 | Endo et al. | |
| 4,765,834 A | | 8/1988 | Ananthapadmanabhan et al. | |
| 4,889,694 A | * | 12/1989 | Spink et al. | 423/110 |
| 4,894,134 A | | 1/1990 | Birken et al. | |
| 5,024,740 A | | 6/1991 | Birken et al. | |
| 5,091,160 A | | 2/1992 | Kondos et al. | |
| 5,382,412 A | * | 1/1995 | Kim et al. | 422/142 |
| 5,393,320 A | * | 2/1995 | Gomez | 75/10.67 |
| 5,420,039 A | | 5/1995 | Renoe et al. | |
| 5,505,857 A | | 4/1996 | Misra et al. | |
| 5,521,360 A | | 5/1996 | Johnson et al. | |
| 5,531,805 A | | 7/1996 | Worner | |
| 5,535,890 A | | 7/1996 | Behl et al. | |
| 5,603,411 A | | 2/1997 | Williams et al. | |
| 5,681,434 A | | 10/1997 | Eastlund | |
| 5,746,987 A | | 5/1998 | Aulbaugh et al. | |
| 5,784,682 A | | 7/1998 | Birken et al. | |
| 5,824,133 A | | 10/1998 | Tranquilla | |
| 5,938,833 A | | 8/1999 | Willis et al. | |
| 5,972,302 A | | 10/1999 | Tranquilla et al. | |
| 5,997,607 A | | 12/1999 | Birken et al. | |
| 6,082,548 A | * | 7/2000 | Stephenson et al. | 209/4 |
| 6,090,350 A | | 7/2000 | Birken et al. | |
| 6,099,738 A | | 8/2000 | Wechsler et al. | |
| 6,106,853 A | | 8/2000 | Cox et al. | |
| 6,131,835 A | | 10/2000 | Johnson | |
| 6,131,836 A | | 10/2000 | Johnson | |
| 6,143,136 A | | 11/2000 | Aulbaugh et al. | |
| 6,210,625 B1 | | 4/2001 | Matsushita et al. | |
| 6,267,850 B1 | | 7/2001 | Bailey et al. | |
| 6,277,168 B1 | | 8/2001 | Huang et al. | |
| 6,323,455 B1 | | 11/2001 | Bailey et al. | |
| 6,923,328 B2 | * | 8/2005 | Birken | 209/3 |
| 7,571,814 B2 | * | 8/2009 | Birken | 209/11 |
| 2001/0030160 A1 | | 10/2001 | Wechsler et al. | |

* cited by examiner

FIG. 12

METHOD AND APPARATUS FOR SEPARATING METAL VALUES

RELATED APPLICATIONS

This application is a divisional application of U.S. application Ser. No. 10/951,935 filed Sep. 28, 2004 now U.S. Pat. No. 7,571,814, which is a continuation-in-part of U.S. application Ser. No. 10/080,773 filed Feb. 22, 2002, now U.S. Pat. No. 6,923,328 issued Aug. 2, 2005.

BACKGROUND OF THE INVENTION

1. Field of the Invention

The present invention relates to mineral processing, and more particularly, to a method and apparatus for separating metal values, such as nickel and nickel compounds, from mineral ores, including lateritic ores.

2. Discussion

Nickel is an important element and is used in a variety of products. It is often combined with other metals to form stainless steels and alloy steels, nonferrous and high temperature alloys. It is also used in electroplating, catalysts, ceramics and magnets.

Though nickel can be found in many different types of mineral deposits, currently only sulfide and lateritic ores can be mined economically using existing technology. In sulfide ores, nickel, iron and copper comprise a physical mixture of distinct minerals. This allows producers to concentrate the nickel present in sulfide ores using mechanical techniques, such as flotation and magnetic separation. Lateritic ores have a significantly different structure than sulfide ores. As a result, nickel producers cannot use straightforward mechanical or physical separation techniques to concentrate the nickel in lateritic ores, but instead must use chemical separation techniques.

One of the most promising chemical methods for obtaining nickel values from lateritic ores is called high pressure acid leaching. In the method, crushed and sized lateritic ore is placed in a pressure vessel with sulfuric acid. The mixture is agitated at high temperature and high pressure (e.g., 280° C., 5.4 MPa) to leach out nickel and cobalt. The resulting liquid phase, which includes dissolved nickel and cobalt, undergoes further processing to separate nickel and cobalt.

Though a useful technology, high pressure acid leaching suffers certain disadvantages. As currently practiced, high pressure acid leaching is carried out in a batchwise manner. Since nickel comprises only about one percent of a typical lateritic ore, the pressure vessel must be charged with large amounts of ore—e.g., one hundred tons of ore—to meet daily production requirements. This results in a large capital outlay for equipment. As compared to mechanical techniques, operating costs are high because the entire mixture must be heated to relatively high temperatures to extract a significant fraction of nickel and cobalt from the solid phase. Finally, disposal of spent sulfuric acid raises environmental concerns.

The present invention overcomes, or at least mitigates, one or more of the problems described above.

SUMMARY OF THE INVENTION

The present invention provides methods and apparatuses for separating metal values, such as nickel and nickel compounds, from mineral ores, including lateritic ores. The inventive methods use physical processes to concentrate metal values and therefore do not raise environmental concerns associated with chemical processing. In addition, the methods are adapted to continuously process ores, which results in lower capital outlays than batch operations. Finally, the disclosed invention utilizes electromagnetic microwave/millimeter wave (hereinafter "microwave/millimeter wave") energy to selectively heat components of the ore, which helps conserve energy resources.

One aspect of the invention thus provides a method of separating components of a mixture of particles, which is comprised of at least a first group of particles and a second group of particles. Group members have similar chemical composition, while particles belonging to different groups have dissimilar chemical compositions. The method also includes exposing the mixture of particles to microwave/millimeter wave energy in order to differentially heat the first and second group of particles, thereby increasing the difference in magnetic susceptibility between the first and second group of particles. Finally, the method comprises exposing the mixture of particles through a magnetic field gradient, which causes the particles to separate into first and second fractions. The first and second fractions have, respectively, greater percentages of the first and second groups of particles than the mixture.

A second aspect of the invention provides a method of concentrating nickel values of a lateritic ore. The method comprises providing a lateritic ore comprised of a mixture of particles, and exposing the lateritic ore to microwave/millimeter wave energy in order to selectively heat particles that contain substantial amounts of nickel values. The exposure to microwave/millimeter wave energy increases the difference in magnetic susceptibility between the particles that contain substantial amounts of nickel values and particles that do not. In addition, the method includes exposing the lateritic ore through a magnetic field gradient, which causes at least some of the particles that contain substantial amounts of nickel values to separate from the mixture of particles.

A third aspect of the invention provides an apparatus for separating components of a mixture of particles. The apparatus includes a vessel having an interior for containing the mixture of particles during processing, and an energy system coupled to the vessel for exposing the mixture of particles to microwave/millimeter wave energy. The apparatus also includes a magnetic separator that communicates with the interior of the vessel. The magnetic separator is adapted to separate magnetic particles from non-magnetic particles.

A fourth aspect of the invention provides an apparatus for continuously separating components of a mixture of particles. The apparatus includes a vessel for containing the mixture of particles during processing. The vessel has a first end and a second end and an inlet located adjacent to the first end of the vessel that permits entry of the solid particles into the vessel. The apparatus also includes a gas distributor that is disposed within the vessel for fluidizing the mixture of particles, and an energy system that is coupled to the vessel for exposing the mixture of particles to microwave/millimeter wave energy. Finally, the apparatus also includes a magnetic separator, which is located adjacent the second end of the vessel and which is used to separate magnetic particles from non-magnetic particles.

A fifth aspect of the invention thus provides a method of separating components of a mixture of particles, which is comprised of at least a first group of particles and a second group of particles. Group members have similar chemical composition, while particles belonging to different groups have dissimilar chemical compositions. The method also includes exposing the mixture of particles to microwave/millimeter wave energy generally concurrently with exposing the mixture of particles to a reactant. The microwave/millimeter wave energy acts to differentially heat the first and second group of particles, thereby increasing the difference in magnetic susceptibility between the first and second group of particles. Additionally, the reactant enhances the magnetic susceptibility of at least one of the groups of particles. Finally, the method comprises exposing the mixture of particles through a magnetic field gradient, which causes the particles to separate into first and second fractions. The first and second fractions have, respectively, greater percentages of the first and second groups of particles than the mixture.

A sixth aspect of the invention provides a method of concentrating nickel values of a lateritic ore. The method comprises providing a lateritic ore comprised of a mixture of particles, and exposing the lateritic ore to microwave/millimeter wave energy in order to selectively heat particles that contain substantial amounts of nickel values. Concurrently (or generally concurrently) with exposing the particles to microwave/millimeter wave energy, the particles are also exposed to a reactant. The exposure to microwave/millimeter wave energy increases the difference in magnetic susceptibility between the particles that contain substantial amounts of nickel values and particles that do not. The magnetic susceptibility is further enhanced by the chemical reaction between the reactant and the particles containing substantial amounts of nickel values. Further, the method includes exposing the lateritic ore to a magnetic field gradient, which causes at least some of the particles that contain substantial amounts of nickel values to separate from the mixture of particles.

A seventh aspect of the invention provides an apparatus for separating components of a mixture of particles. The apparatus includes a vessel having an interior for containing the mixture of particles during processing, an energy system coupled to the vessel for exposing the mixture of particles to microwave/millimeter wave energy and a source for exposing the particles to a reactant. The apparatus also includes a magnetic separator that communicates with the interior of the vessel. The magnetic separator is adapted to separate magnetic particles from non-magnetic particles.

An eighth aspect of the invention provides an apparatus for continuously separating components of a mixture of particles. The apparatus includes a vessel for containing the mixture of particles during processing. The vessel has a first end and a second end and an inlet located adjacent to the first end of the vessel that permits entry of the solid particles into the vessel. The apparatus also includes a gas distributor that is disposed within the vessel for fluidizing the mixture of particles, and an energy system that is coupled to the vessel for exposing the mixture of particles to microwave/millimeter wave energy. The vessel also includes a source for exposing the particles to a reactant for enhancing the magnetic susceptibility of the particles. Finally, the apparatus also includes a magnetic separator, which is located proximate the second end of the vessel and which is used to separate magnetic particles from non-magnetic particles.

DETAILED DESCRIPTION

Figure 1:
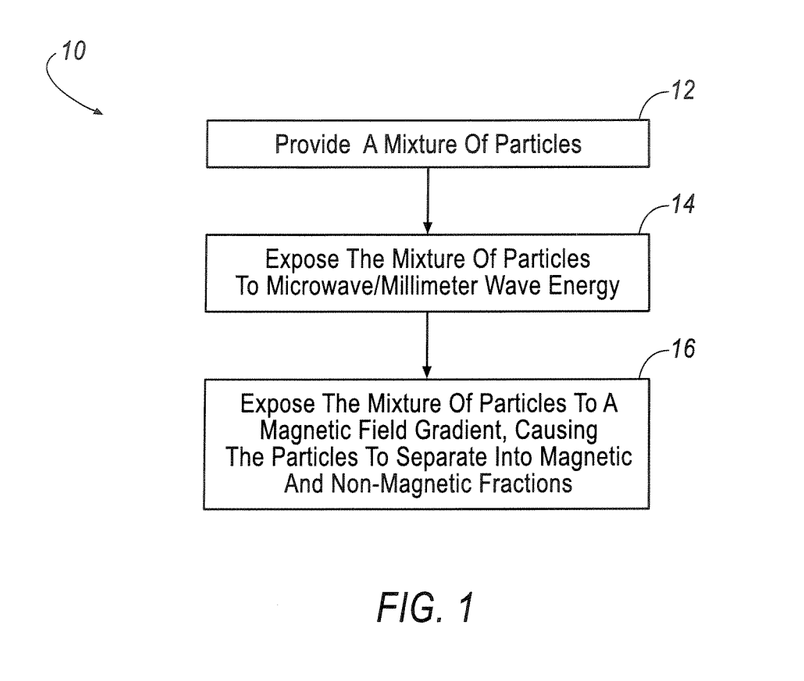
FIG. 1 is a block diagram showing a method of separating components of a mixture of particles.

FIG. 1 provides an overview of a method 10 of separating components of a mixture of particles. The method relies on heating groups of particles to different temperatures using microwave/millimeter wave energy, and then exploiting changes in magnetic susceptibility among the particles—resulting from the temperature differences—to effect a magnetic separation of the groups of particles. The method can be used to extract metal values from mineral ores that ordinarily are not amenable to physical separation techniques. For example, and as discussed below, the method can be used to concentrate nickel values from lateritic ores without the high temperatures, high pressures, and harsh acidic conditions associated with acid leaching. Unless clear from the context of the discussion, the terms "nickel," "cobalt," and "iron" or "nickel values," "cobalt values," and "iron values," etc. may refer, respectively, to nickel, cobalt and iron atoms or to compounds that contain nickel, cobalt and iron atoms.

As shown in FIG. 1, the method 10 includes providing 12 a mixture of particles in an enclosure, vessel or cavity. The mixture of particles is comprised of at least a first group of particles and a second group of particles. Individual particles that belong to a particular group—i.e., first group, second group, etc.—have similar chemical composition, whereas particles that belong to different groups have dissimilar chemical compositions. Thus, for example, crushed and sized lateritic ore may comprise a first group of particles that contain predominantly nickel oxide, a second group of particles that contain predominantly cobalt oxide, a third group of particles that contain iron oxide (FeO) and a fourth group of particles that contain comparatively valueless earth (gangue). Individual nickel oxide, cobalt oxide or iron oxide particles may include gangue, as well as minor portions of other metal oxides.

Besides providing a mixture of particles, the method 10 also includes exposing 14 the mixture to microwave/millimeter wave energy. Since dissimilar substances generally absorb microwave/millimeter wave radiation in differing amounts, exposing the mixture of particles to microwave/millimeter wave radiation, results in differential or selective heating of the groups of particles. Moreover, for many substances, including ferromagnetic and antiferromagnetic materials, magnetic susceptibility (i.e. the ratio of the induced magnetization to magnetic field intensity) depends on the temperature of the material. For instance, a ferromagnetic material will lose all magnetic properties above its Curie temperature and an antiferromagnetic material will exhibit maximum magnetic susceptibility at its Néel temperature. Nickel oxide, for example, should exhibit maximum magnetic susceptibility at its Néel temperature, which ranges from about 260° C. to about 377° C., and FeO should exhibit maximum magnetic susceptibility at its Néel temperature, which is about −75° C.

As noted above, the method 10 shown in FIG. 1 utilizes changes in magnetic susceptibility among the particles to separate the groups of particles. Thus, the method 10 includes exposing 16 the mixture of particles to a magnetic field gradient, which causes the particles to separate into first and second fractions. The first and second fractions are comprised primarily of the first and second groups of particles, respectively. Thus, for example, the first group of particles may comprise nickel oxide particles, which have been selectively heated to about their Néel temperature. The second group of particles may comprise gangue (e.g., silicon dioxide) and the like which have been heated to a lesser extent. When the mixture of particles are exposed to the magnetic field gradient, the nickel oxide particles tend to align themselves with the lines of force that comprise the magnetic field gradient, whereas the non-nickel particles remain relatively unaffected by the magnetic field gradient. Since the nickel oxide particles follow the lines of magnetic force, the method 10 diverts nickel oxide particles away from the primary flow direction of the mixture of particles.

Effective separation will depend on many factors, including the size distribution of the mixture of particles, differences in magnetic susceptibility among the groups of particles, the intensity of the applied magnetic field gradient, and so on. Depending on the type of magnetic separator used, the particle sizes of the base material (e.g., the mineral ore) usually range from about $10^{-1}$ microns to about $10^4$ microns. For high gradient magnetic separators, which can apply magnetic field gradients up to about $25 \times 10^6$ G/cm, the particle sizes of the base material typically fall within the lower portion of the particle size range—i.e., from about $10^{-1}$ microns to about $10^2$ microns. For other types of dry magnetic separators, which can apply magnetic field gradients between about $10^2$ G/cm and $10^5$ G/cm, the particles sizes of the base material ordinarily fall within the upper portion of the particle size range.

In many cases, only one of the groups of particles will exhibit measurable magnetic susceptibility following exposure to microwave/millimeter wave energy and that group will be the valuable component. In other cases, the valuable component may exhibit negligible magnetic susceptibility, while the remaining particles are magnetic. In instances when two or more groups of particles exhibit substantial magnetic susceptibility, and only one of the group of particles is of interest, microwave/millimeter wave exposure can be adjusted to maximize the differences in magnetic susceptibility among the particles of interest and the other particles of the mixture. Since the magnitude of magnetic susceptibility of a material at its Néel temperature is generally weaker than a ferromagnetic material below its Curie temperature, the method 10 often employs a high gradient magnetic separator.

The method 10 may include other optional steps. For example, the method 10 may include contacting the mixture of particles with an inert or reactive gas. Such contacting may be desirable for many reasons. For example, the method 10 may employ a gas to fluidize the particles, which as described below, helps convey the mixture of particles through process equipment. Alternatively or additionally, the method 10 may use a gas to strip impurities from the solid particles, to form desired reaction products, and the like.

Figure 2:
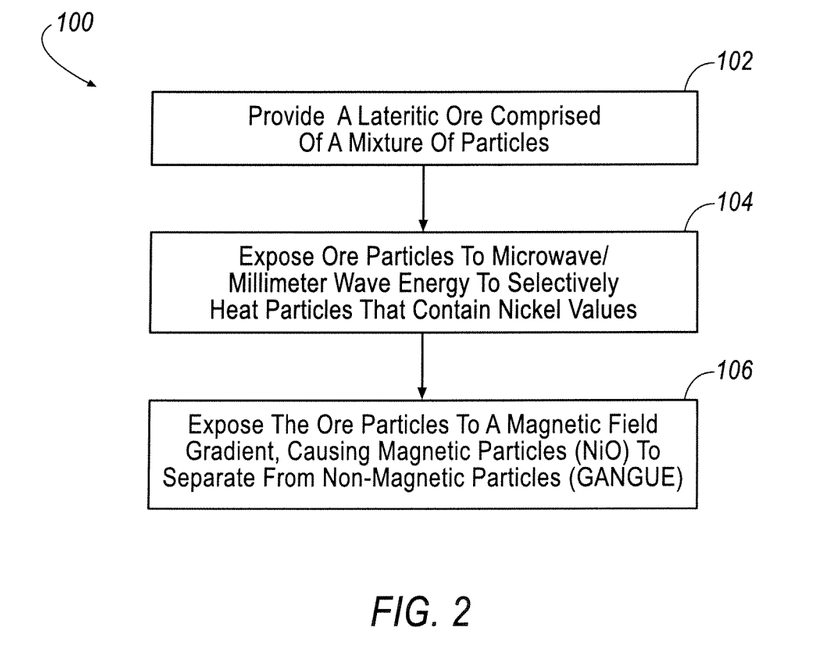
FIG. 2 is a block diagram showing a method of concentrating nickel values of a lateritic ore.

Turning now to an exemplary application, FIG. 2 illustrates a method 100 of concentrating nickel values of a lateritic ore. It should be noted, however, that with suitable modification the method 100 could be used to concentrate many different metal values from a variety of mineral ores. As shown in FIG. 2, the method 100 includes providing 102 a lateritic ore comprised of a mixture of particles. This step may comprise a variety of tasks, including extraction of the lateritic ore from the earth, transportation and storage of the mined ore, and the like. In addition, since effective magnetic separation requires that the component or components of interest comprise discrete particles, the providing step may include liberating the component of interest from the ore matrix—here, nickel oxide—by crushing, grinding (if necessary), and sizing (e.g., screening) the ore particles.

After the particles are crushed and ground to the requisite size, which for a typical lateritic ore is less than about 20 mesh or about 1.3 mm, the ore is exposed 104 to microwave/millimeter wave energy in order to selectively heat particles that contain substantial amounts of nickel values. By selectively heating the nickel oxide particles, the method 100 increases the difference in magnetic susceptibility between particles that contain substantial amounts of nickel values and particles that do not. For nickel oxide, this corresponds to heating the particles to their Néel temperature, which is between about 260° C. and 377° C. It should be understood that the nickel oxide particles could be heated to temperatures different than the Néel temperature (e.g., between 150° C. and 300° C.) so long as they attain the desired level of magnetic susceptibility.

The method 100 also includes exposing 106 the lateritic ore to a magnetic field gradient, which causes at least some of the particles that contain substantial amounts of nickel values to separate from the mixture of particles. Besides nickel values, lateritic ores generally contain other metal values, which will likely have been selectively heated to a temperature different than their Néel temperatures. These particles may retain residual magnetic susceptibility so that during the magnetic separation step, some of them may be entrained by the nickel oxide particles. The resulting concentrated nickel values, and perhaps a small fraction of entrained metal values, may undergo further processing (refining, smelting, etc.) or can be sold as a finished product.

Figure 3:
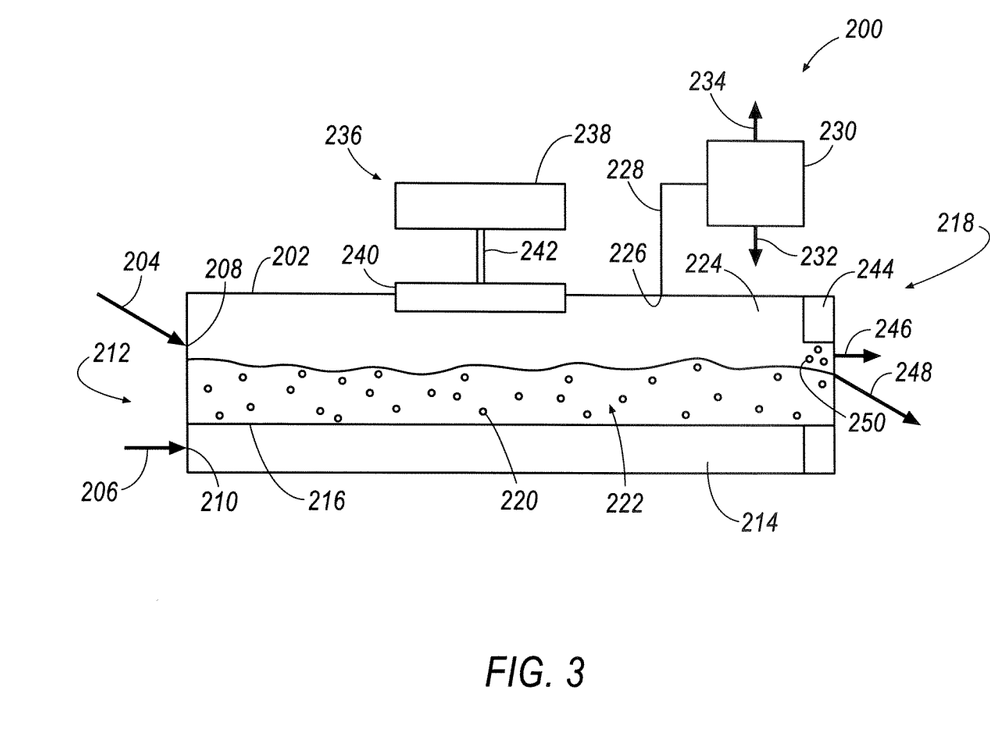
FIG. 3 is schematic view of an apparatus for separating metal values, such as nickel, from a mineral ore, including a lateritic ore.

FIG. 3 shows an apparatus 200 that can be used carryout the processes 10, 100 shown in FIG. 1 and FIG. 2, respectively. The apparatus 200 comprises a vessel 202, which contains the mixture of particles (e.g., crushed and sized ore) during processing. As indicated by arrows 204, 206, the mixture of particles and a gas (typically compressed air, which may be cooled or heated) enter the vessel 202 via ports 208, 210 at a first end 212 of the vessel 202. The gas dumps into a plenum 214 and flows upward through a gas distributor 216 (i.e., grating or perforated plate) that spans the distance between the sides and the first 212 and second 218 ends of the vessel 202.

The solid particles, which are shown schematically as circles 220 in FIG. 3, travel from the first 212 to the second 218 ends of the vessel 202 along the gas distributor 216. To help convey the solid particles 220 between the ends 212, 218 of the vessel 202, the gas flowing upward through the distributor 216 lifts the particles 220, producing a fluidized bed 222 that behaves in a manner similar to a liquid. The gas used to fluidize the particles 220, flows into a disengaging space 224 and exits the vessel 202 via a port 226. A conduit 228 channels the gas into a dust separator 230 (e.g., cyclone) that removes any entrained solids 232 from the gas stream 234. In addition to acting as a fluidizing medium, the gas may strip off impurities, provide a surface coating, react to form a desired product, and so on.

The apparatus 200 includes an energy system 236, which can be used to expose the particles 220 to microwave/millimeter wave energy via a radiative technique. The system 236 includes a source 238 of microwave/millimeter wave energy and an applicator 240, which is disposed within the vessel 202. The system 236 also includes a waveguide 242, which directs the microwave/millimeter wave energy from the source 238 to the applicator 240. As used in this disclosure, microwave/millimeter wave energy refers to energy having frequencies as low as 100 MHz to as high as 3000 GHz. For a discussion of useful systems for generating and applying microwave/millimeter wave energy to process materials, see U.S. Pat. Nos. 4,894,134; 5,784,682; and 6,090,350, which are herein incorporated by reference in their entirety and for all purposes.

As can be seen in FIG. 3, after the particles 220 have been differentially heated through exposure to microwave/millimeter wave energy from the applicator 240, they reach the second end 218 of the vessel 202 where they pass through a magnetic separator 244. As indicated by arrows 246, 248, the magnetic separator diverts magnetic particles 250 (i.e., those having a threshold magnetic susceptibility) away from the non-magnetic particles thereby concentrating the magnetic particles (or non-magnetic particles). As noted above, high gradient magnetic separators are especially useful, but depending on the magnetic susceptibility of the magnetic particles 250, other devices can be used. For a discussion of useful magnetic separators, see Robert H. Perry and Don W. Green, "Perry's Chemical Engineer's Handbook," pp. 19-40 to 19-49 (7th Ed., 1997).

Although the apparatus 200 shown in FIG. 3 utilizes a fluidized bed 222 to convey individual particles 220 between the ends 212, 218 of the vessel 202, other devices can be used. For example, some embodiments may use moving belts, which can be coupled to a magnetic pulley at the second end 218 of the vessel 202 for carrying out the magnetic separation. Other embodiments may rely on gravity to convey particles and may include a gas distribution system for contacting the particles with an inert or reactive gas to strip impurities from the particles, form desired reaction products, modify the surfaces properties of the particles, and the like. The apparatus 200 shown in FIG. 3 is adapted to continuously process mixtures of particles, which minimizes the requisite size of the vessel 202 and hence capital expenditures. However, other apparatuses may be used that operate in a batch or semi-batch mode, which would likely result in higher capital and labor costs, but may result in greater recovery of the material of interest.

Other embodiments may channel the magnetic particles 250 into a second vessel (not shown) where the particles 250 undergo further treatment. Like the apparatus 200 shown in FIG. 3, the second vessel may include the necessary structures for heating the particles 250 (e.g., microwave/millimeter wave source) and for contacting the magnetic particles 250 with an inert or reactive gas (e.g., gas distributor). Such an apparatus could employ a gas that may be the same as or different than any fluidizing gas used, and which includes sulfur (e.g., hydrogen sulfide) in order to convert nickel oxide to nickel sulfide.

Figure 4:
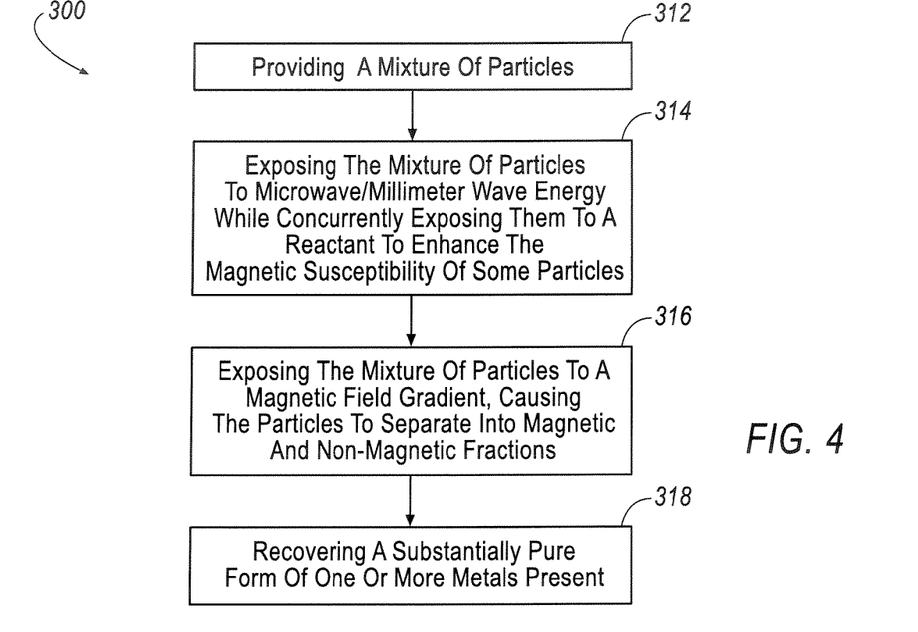
FIG. 4 is a block diagram showing a method of separating a mixture of particles while exposing them to microwave/millimeter wave energy and to a reactant.

FIG. 4 provides an overview of a method 300 of separating components of a mixture of particles. The method relies on heating groups of particles to different temperatures using microwave/millimeter wave energy (for example microwave/millimeter wave energy as generated by a gyrotron) while generally concurrently exposing the particles to a reactant. Both the heating of the particles in combination with the chemical change therein caused by the reactant, enhances the magnetic susceptibility of some of the particles (especially those containing metal). This enhancement in magnetic susceptibility is greater than enhancements that can be attained using wave energy alone or using a reactant alone. The enhanced magnetic susceptibility promotes extracting metal values from mineral ores that, otherwise, would not ordinarily be possible or cost effective.

As shown in FIG. 4, the method 300 includes providing a mixture of particles 312 in an enclosure, vessel, cavity or the like. The mixture of particles is comprised of at least a first group of particles and a second group of particles. Individual particles that belong to a particular group (e.g. first group, second group, etc.), have similar chemical compositions, wherein particles that belong to a different group have dissimilar chemical compositions. Thus, for example, crushed and sized lateritic ore may include a first group of particles that contain predominantly nickel oxide, a second group of particles that contain predominantly cobalt oxide, a third group of particles that contain iron oxide, and a fourth group of particles that contain comparatively valueless earth. Individual nickel oxide, cobalt oxide, or iron oxide particles may include valueless earth as well as minor portions of one or more other metal oxides.

After the mixture of particles are provided 312, method 300 includes then exposing 314 the mixture of particles to microwave/millimeter wave energy. Such microwave/millimeter wave energy can be derived from any number of sources, but the preferred source is a gyrotron. Concurrently (or generally concurrently) with heating the mixture of particles by exposing the mixture of particles to microwave/millimeter wave energy, the particles are exposed to a reactant to enhance the magnetic susceptibility of some of the particles. The application of reactant does not have to be concurrent with exposing the mixture of particles to microwave/millimeter wave energy. It is only necessary for there to be sufficient proximity and time to minimize efficiency losses due to loss of heat. Although heating particles alone will enhance the magnetic susceptibility of some groups of particles, further enhancement to the magnetic susceptibility of some groups of particles can be accomplished by exposing the particles to a reactant 314. A suitable reactant includes, but is not limited to, sulfur, any compound containing sulfur, any halogen, or any compound containing a halogen. Halogens include, but are not necessarily limited to fluorine, chlorine, bromine, iodine, astatine, or the like. For example, nickel oxide has a much lower magnetic susceptibility than nickel chloride or nickel sulfate (e.g. nickel oxide has a magnetic susceptibility of 660 wherein nickel sulfate has a magnetic susceptibility of 4,005 and nickel chloride has a magnetic susceptibility of 6145).

Next, (step 316) the particles are exposed to a magnetic field gradient. This magnetic field gradient causes the particles to separate into magnetic and non-magnetic fractions. The particles which evidence the highest magnetic susceptibility will tend to separate to a great degree from those particles which have a lower magnetic susceptibility. Thus, method 300 includes exposing 316 a mixture of particles to a magnetic field gradient which causes the particles to separate into at least first and second fractions composed of at least first and second groups of particles respectively. For example, the first group of particles may comprises nickel chloride particles and the second group of particles may comprise gangue (e.g., silicone dioxide) and the like. When the mixture of particles are exposed to the magnetic field gradient, the nickel chloride particles tend to align themselves with the line of force that comprise the magnetic field gradient, whereas the non-nickel chloride particles remain relatively unaffected by the magnetic field gradient. Since the nickel chloride particles follow the lines of magnetic force, method 300 diverts nickel compounds away from the primary flow direction of the remaining mixture of particles.

Effective separation of the magnetic and non-magnetic particles will depend on many factors, including the size distribution of the mixture of particles, differences in magnetic susceptibility among the groups of particles, the intensity of the applied magnetic field gradient, the effectiveness of the reactant to enhance the magnetic susceptibility of the particles, and so on. Depending on the type of magnetic separator used, the particle sizes of the base material (e.g. the mineral ore) usually range from about $10^{-1}$ micron to about $10^4$ microns. Separators utilizing high gradient magnetic fields can generate field strengths up to, about $25 \times 10^6$ G/cm. In one embodiment, the microwave/millimeter wave energy source 238 includes a gyrotron. For other types of dry magnetic separators, magnetic field gradients between about $10^2$ G/cm and $10^5$ G/cm can be attained.

In some cases, only one of the groups of particles will exhibit measurable magnetic susceptibility following exposure to the reactant in combination with the microwave/millimeter wave energy source and that group will be the valuable component sought for extraction. In other cases, the valuable component may exhibit negligible magnetic susceptibility while the remaining particles exhibit high magnetic susceptibility. In instances when two or more groups of particles exhibit substantial magnetic susceptibility, and only one of the groups of particles is of interest, microwave/millimeter wave exposure in combination with reactant exposure can be adjusted to maximize the differences in magnetic susceptibility amongst the particles of interest and the other particles of the mixture. In some applications, it may be advantageous to employ a high gradient magnetic separator (as opposed to a dry magnetic separator).

Method 300 may include other optional steps. For example, step 318 includes recovering a substantially pure form of one or more of the metals present in the particles of interest. For example, method 300 includes contacting the mixture of particles with a reactant (such as chlorine). In such a reaction, the resulting particles of interest would be nickel chloride. In order to recover the pure nickel from the nickel chloride, a leach cycle, a smelter or a second microwave/millimeter wave heating source can be used to extract the pure nickel from its chloride form (discussed more fully in conjunction with FIGS. 6 and 7). The leach cycle can be combined with further recovery techniques (such as hydrogen reduction) to recover particles of interest from solution.

Exposing the particles to a reactant can be accomplished using any number of methods. For example, method 300 may employ a pressurized reactant to fluidize the particles, which as described below, helps convey the mixture of particles through the process equipment. Alternatively, or additionally, method 300 may expose the particles to a reactant at the time the particles are heated by the microwave/millimeter wave energy source wherein the reactant has no role in fluidizing the particles. The reactant can be exposed to the particles in any number of methods including enveloping the particles with a reactant which is in a gaseous state while the particles are being heated, coating the particles with a reactant that is in a liquid or powdered state, or simply introducing the reactant in proximity to the mixture of particles such that the microwave/millimeter wave energy is effective for heating the reactant causing it to gasify and expand thereby coating the mixture of particles. Also, the exposure of the reactant to the particles may take place in a vessel that is open to atmosphere. In the alternative, the exposure of the reactant may take place in a vessel that is maintained at a pressure other than atmospheric pressure. It is believed that a vessel maintained at a pressure greater than atmospheric pressure may promote a more thorough chemical reaction between the reactant and the particles of interest.

Figure 5:
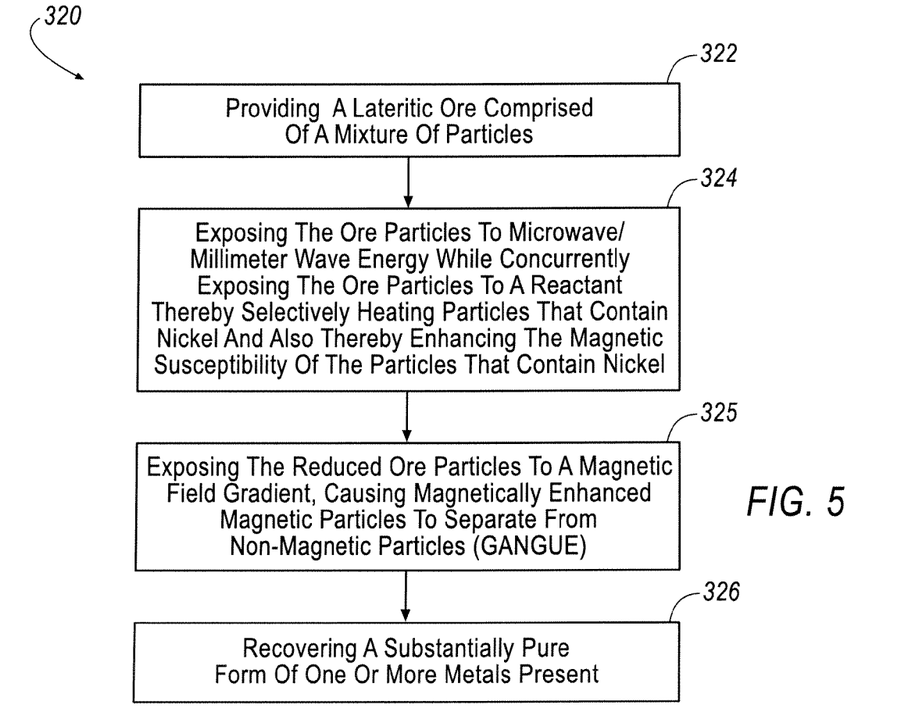
FIG. 5 is a block diagram showing a method of concentrating nickel from lateritic ore using both wave energy and a reactant to enhance the magnetic susceptibility of some particles of the lateritic ore.

Now turning to an exemplary application, FIG. 5 illustrates a method 320 of concentrating nickel values of a lateritic ore. It should be noted however that with suitable modification, method 320 could be used to concentrate many different metal values from a variety of mineral ores. As shown in FIG. 5, method 320 includes a first step of providing a lateritic ore comprised of a mixture of particles 322. This step may comprise a variety of tasks, including extraction of the lateritic ore from the earth, transporting and storing the mined ore, and the like. In addition, because effective magnetic separation requires that the component or components of interest include discreet particles, step 322 may include liberating the component of interest (in this example, nickel oxide), from the ore matrix. This liberating can be accomplished by any number of techniques including but not limited to, crushing, grinding, and sizing (e.g. screening) the ore particles.

After the particles are separated to the requisite size, which for a typical lateritic ore is less than about 20 mesh or about 1.3 millimeter, the ore is exposed 324 to microwave/millimeter wave energy in order to selectively heat particles that contain a substantial amount of nickel values. Concurrently or generally concurrently with heating the particles, the particles are also exposed to a reactant. This reactant acts to enhance the magnetic susceptibility of the particles that contain substantial amounts of nickel values and does not significantly enhance the magnetic susceptibility of particles that do not include metal. Reactants include, but are not limited to, sulfur, sulfur compounds, one or more halogens, or one or more halogen compounds. The combined effect of heating the particles and exposing them to a reactant acts to greatly enhance their magnetic susceptibility more so than that which could be achieved using only one of these methods. The present invention is effective when nickel oxide particles are heated from about 250° C. or higher and even more preferably when nickel oxide particles are heated from about 500° C. or higher.

Method 320 also includes the step of exposing 325 the heated particles to a magnetic field gradient which causes at least some of the particles that contain substantial amounts of nickel values to separate from the mixture of particles that do not contain a substantial amount of nickel values. In addition to nickel values, lateritic ores generally contain other metal values. These particles may retain residual magnetic susceptibility so that during the magnetic separation step 325, some of them may be entrained by the nickel particles. The resulting nickel compound and perhaps a small fraction of entrained non-nickel metal values, may undergo further processing (refining, smelting, etc.) or can be sold as a finished product.

In an optional step 326, the separated particles can be further processed to extract a substantially pure form of nickel or any other metal of interest. This extraction process can include using a leach cycle followed by a recovery cycle, using a traditional smelting techniques, or using a second source of microwave/millimeter wave energy to heat the separated nickel compound to produce pure nickel or substantially pure nickel. Optional step 326 may also include solvent extraction methods, traditional hydrometallurgical or pyrometallurgical techniques all of which are known in the art.

Figure 6:
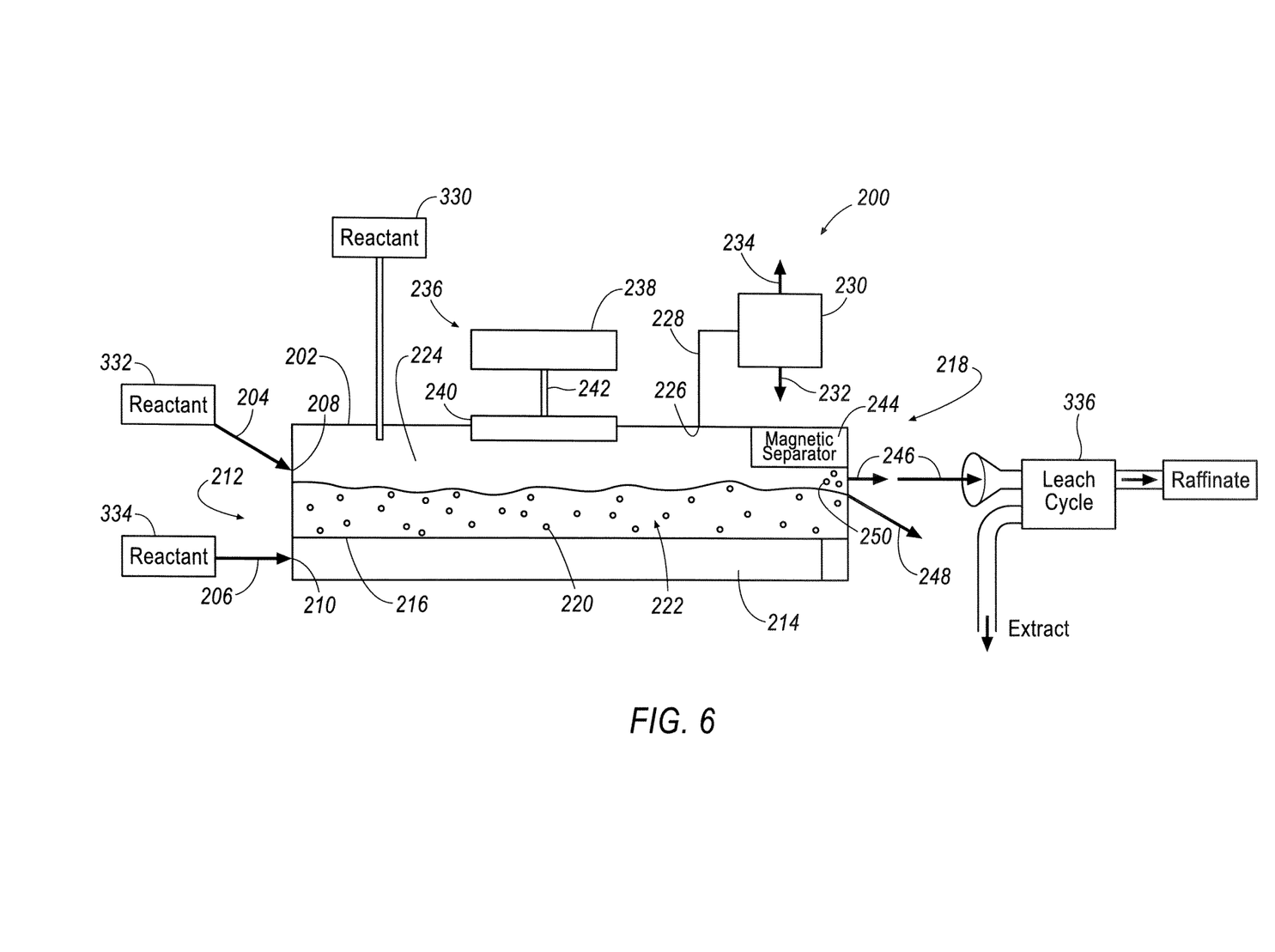
FIGS. 6 and 7 are schematic views of first and second apparatuses, respectively, for separating metallic values, such as nickel from a mineral ore, including a lateritic ore, using both wave energy and a reactant to enhance the magnetic susceptibility of some of the particles of the ore.

Now referring to FIG. 6, with the exception of reactant 330, 332, and 334, apparatus 200 is identical, in every way, to apparatus 200 of FIG. 3. Accordingly, a detailed description of apparatus 200 is unnecessary and apparatus 200 will only be discussed herein to the extent that it differs from apparatus 200 of FIG. 3. Vessel 202 can be used to carry out the process set forth in FIGS. 4 and 5. Apparatus 200 includes vessel 202 which contains a mixture of particles 220 which are exposed to microwave/millimeter wave energy from source 238. Source 238 may include a gyrotron, a millimeter wave source or any other source of microwave/millimeter wave energy. In addition to exposing particles 220 to microwave/millimeter electromagnetic wave energy, particles 220 are also exposed to a reactant. Particles 220 can be exposed to the reactant in any number of ways. One such way of exposing particles 222 to the reactant is by creating a fluidized bed 222 of particles using a compressed gas to propel the reactant or, in the alternative, use a compressed gaseous form of the reactant 334. By taking this approach, particles 220 are not only exposed to reactant 334 but the propellant effect of reactant 206 into vessel 202 assists in moving particles 220 along within vessel 220. In another approach, reactant 332 can be injected from above the particles 220. Reactant 330, 332, or 334 can comprise any number of phases including liquid gas, or solid (e.g. dust or powder). Like reactant 332, reactant 330 could be applied from directly above the layer of particles 220. Although it is contemplated that particles 220 will be exposed to reactant 330, 332, or 334 generally concurrently with exposing the particles to the microwave/millimeter wave energy produced by energy system 236, it is possible to expose particles 220 to the reactant 330, 332, or 334 prior to, or after, exposing the particles to microwave/millimeter wave energy. Regardless of when the reactant 330, 332, or 334 is exposed to the particles, it is important that the temperature of the particles be sufficiently elevated to promote the chemical reaction between the reactant 330, 332, or 334 and the particles 220. It is contemplated the temperatures above 250° C. will be sufficient and temperatures above 500° C. are even more effective. Although as used herein, microwave/millimeter wave energy generally refers to electromagnetic wave energy having frequencies as low as 100 MHz as to as high as 3000 GHz, it is contemplated that microwave/millimeter wave energy in the range from generally about 915 MHz to generally about 500 GHz is a preferred frequency range for processing lateritic ores using these apparatus and methods set forth herein. It is further contemplated that microwave/millimeter wave energy in the range from generally about 24 GHz to generally about 500 GHz is even a more preferred range.

As can be seen from FIG. 6, after particles 220 have been acted on by reactant 330, 332, or 334 and differentially heated through exposure to microwave/millimeter wave energy from the applicator 240, they reach the second end 218 of vessel 202 where they pass through a magnetic separator 244. As indicated by arrows 246, 248, the magnetic separator diverts particles 250 (which have significant magnetic properties) away from particles 248 (which have less significant magnetic properties) thereby segregating particles 250 from particles 248. As noted earlier, high gradient magnetic separators are sometimes useful, but with the methodology set forth herein wherein magnetic susceptibility of the particles is enhanced both by heating and by a reactant, use of high gradient magnetic separators may not be necessary in some applications. However, each ore type presents its own characteristics and high grade magnetic separators may still be needed to effectively and/or efficiently process certain types of ores even though heating and use of a reactant as taught herein is used.

Although apparatus 200 shown in FIG. 6 utilizes a fluidized bed 222 to convey individual particles 220 between ends 212 and 218 of the vessel 202, other devices can be used to transport particles through vessel 202. For example, some embodiments may use moving belts (not shown) which can be coupled to a magnetic pulley at second end 218 of vessel 202 for carrying out the magnetic separation. Other embodiments include those that rely on gravity to move particles through vessel 202 and may include a gas distribution system (in addition to an reactant), for contacting the particles to strip impurities from the particles, to form desired reaction products, to modify the surface properties of the particles and the like. Although the apparatus 200 shown in FIG. 6 is particularly suited to continuously process mixtures of particles, other apparatuses may be used that operate in a batch or semi-batch mode. Processes that operate in a batch or semi-batch mode typically result in higher capital and labor costs, but in some instances may result in greater recovery of the material of interest per unit of ore processed.

As an option, further processing is possible when it is desired to convert the nickel compound 246 to a more pure form of nickel. One method of purifying the nickel compound 246 is to use a leach cycle 336 wherein the material of interest 246 is dissolved by a solvent (extract) and the nickel is then recovered from solution using any number of known techniques (such as electrowinning, or other known techniques of recovering metals from solution).

Figure 7:
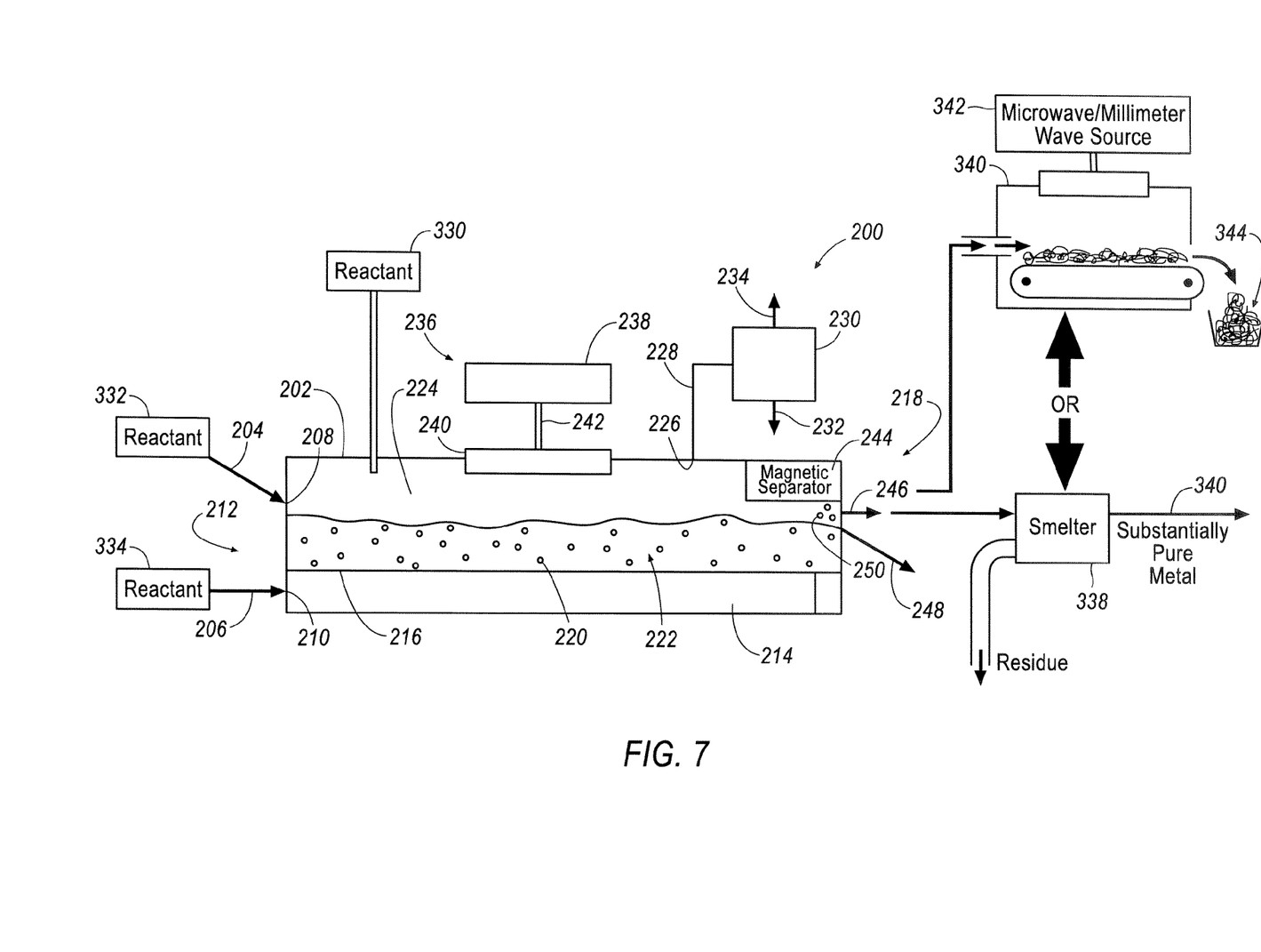

Now referring to FIG. 7, the apparatus 200 of FIG. 7 is, in every way, identical to the apparatus of FIG. 6 except that the leaching post processing apparatus is removed and two alternative post processing operations are disclosed. In a first embodiment, smelter 338 accepts material of interest 246 which is processed therein using traditional smelting techniques to purify the nickel compound 246 thereby generating substantially pure nickel 340. In a second embodiment, material of interest 246 is heated using a microwave/millimeter wave energy source 342 to purify the material of interest thereby generating pure, or substantially pure nickel 344. The microwave/millimeter wave source 342 can operate within an enclosed chamber 340 using a continuous process methodology or it can also use a batch, or semi-batch, processing methodology (not shown).

Figure 8:
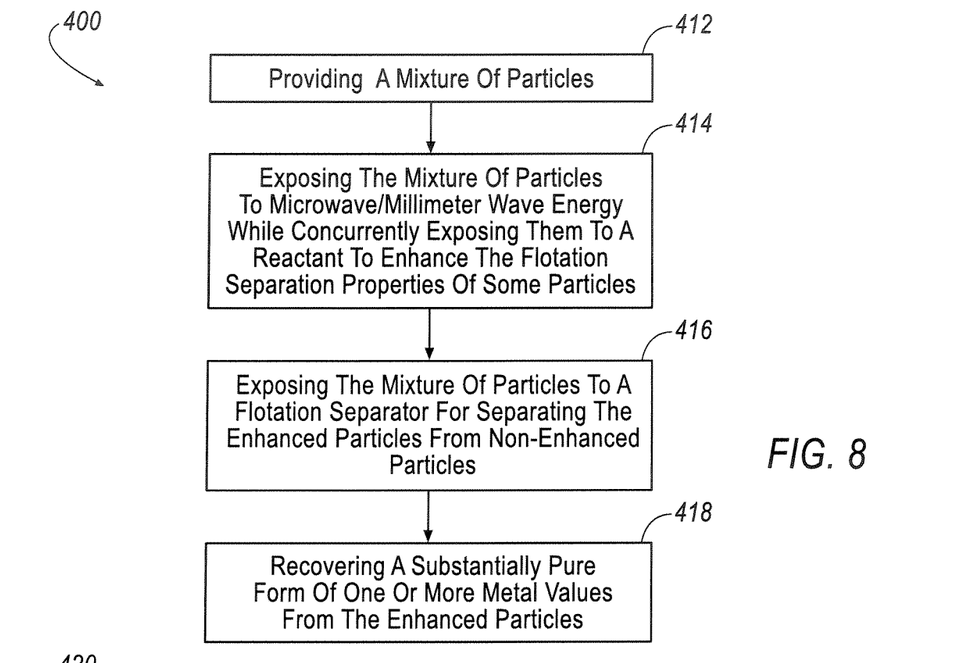
FIG. 8 is a block diagram showing a method of separating components of a mixture of particles using a reactant to enhance the flotation separation properties of some particles.

Now referring to FIG. 8, in still yet another method of the present invention, method 400 includes providing a mixture of particles 412 and exposing the mixture of particles to microwave/millimeter wave energy while concurrently or generally concurrently exposing the particles to a reactant to enhance the flotation separation properties of some particles of the mixture 414. Next, the mixture of particles is exposed to a flotation separator for separating the enhanced particles from the non-enhanced particles 416. Optionally, step may be added 418 for recovering a substantially pure form of one or more metal values from the enhanced particles. Method 400 closely tracks method 300 except that method 400 uses a reactant to enhance the flotation separation properties of some of the particles of the mixture and does not use the reactant to enhance the magnetic separation properties of some of the particles of the mixture. Method 400 relies on a flotation separator to separate particles (not a magnetic separator). In all other ways, method 400 is identical to method 300 therefor, method 400 will only be discussed to the extent that it differs from method 300. An optional step, (step 418) includes recovering a substantially pure form of one or more metal values from the enhanced particles 418. This step closely follows the discussion of step 318 associated with FIG. 4.

Figure 9:
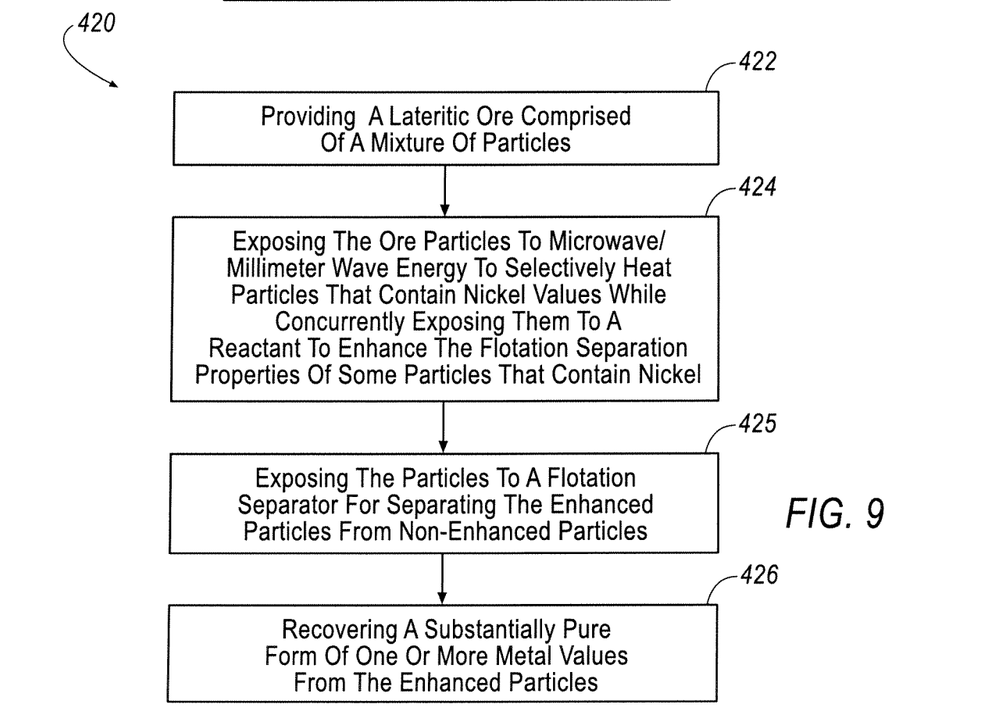
FIG. 9 is a block diagram showing a method of concentrating nickel values of lateritic ore using a reactant to enhance the flotation separation of some of the particles of the lateritic ore.

Turning now to an exemplary application of method 400, FIG. 9 illustrates providing a lateritic ore comprised of a mixture of particles 422. Next, 424 the lateritic ore particles are exposed to microwave/millimeter wave energy while generally concurrently exposing them to a reactant. The heating of the particles using the wave energy source promotes the chemical reaction between the particles and the reactant thereby enhancing the flotation separation properties of some of the particles that contain nickel values 424. Next, the particles are exposed to a flotation separator for separating the enhanced particles from the non-enhanced particles 425. As an optional step, one or more processing steps can be used to recover a substantially pure form of nickel (or any metal value of interest) from the enhanced particles 426. Method 420 is identical to method 320 except that in method 420 a magnetic separator 244 is not used. In its place, a flotation separator 428 is used. In all other ways, method 420 follows method 320 and only the differences between method 420 and method 320 will be discussed hereafter.

Figure 10:
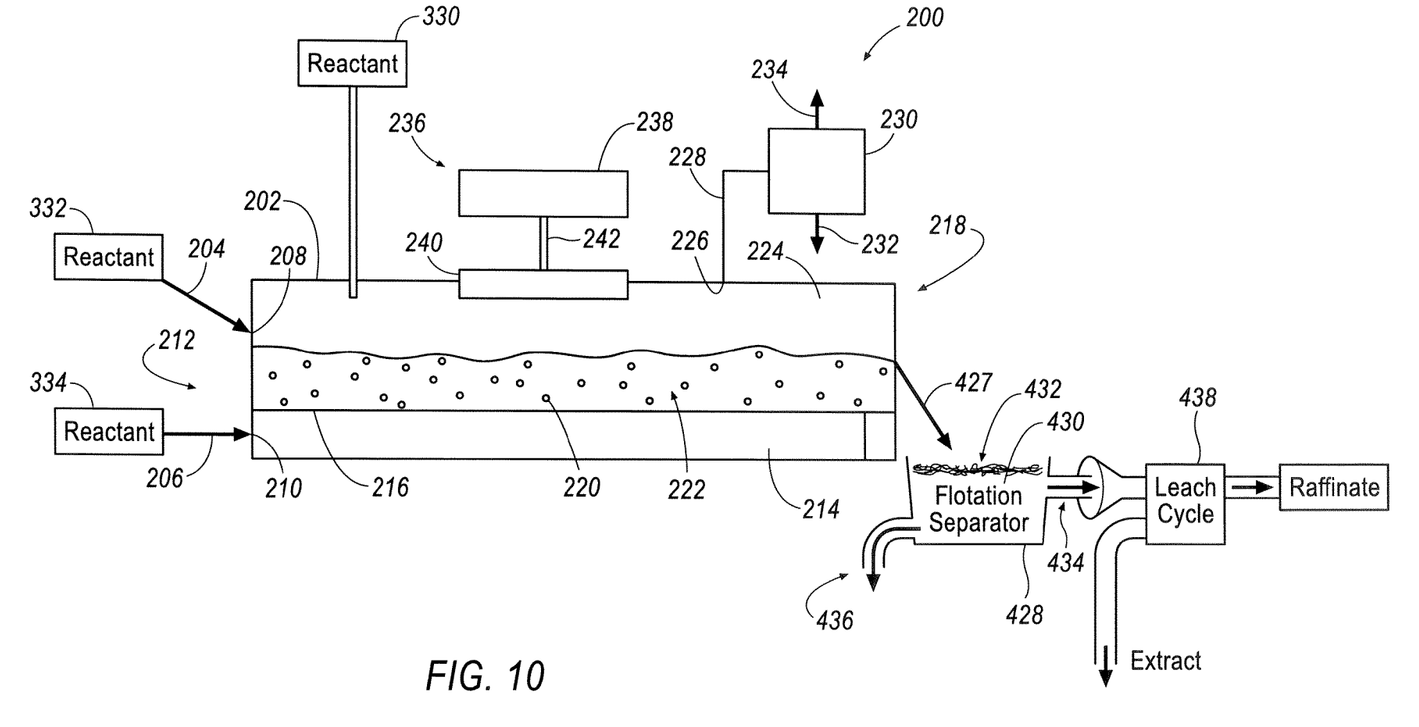
FIGS. 10 and 11 are schematic views of first and second apparatuses, respectively, for separating metal values, such as nickel, from a mineral ore, including a lateritic ore, wherein a reactant is used to enhance the flotation separation properties of some of the particles of the mineral ore.

Now referring to FIG. 10, after particles 220 have been heated and exposed to reactant 330, 332, 334 (using the methods set forth in FIG. 5 and discussed in the corresponding portions of the specification), particles 220 exit second end 218 of apparatus 200. This exit is shown at 427. Particle flow 427 is directed into flotation separator 428. Flotation separator 428 is shown as a froth type flotation separator and it includes a solution 430 (preferably an oil base solution) that is processed to include a froth along its top surface 432. The froth attaches itself to a first group of particles and floats the first group of particles along its surface until they exit 434 therefrom. A second group of particles (which do not have enhanced flotation separation properties) fall through the froth and they are either collected at the solution 430 or they exit flotation separator 428 by way of opening 436. Although it is contemplated that the particles of interest (nickel sulfate, nickel chloride and the like) are the particles that will be carried by the froth and exit at 434, it may be possible given the constituencies of some ores and the nature of some reactants, that the particles of interest could fall through froth 434 and exit at 436 wherein the particles that are not of interest will be captured and carried by froth 432 away from flotation separator 428 via path 434. In the arrangement shown in FIG. 10, it is assumed that the particles of interest are the particles that flow via path 434 and not the particles that flow via 436. Other types of flotation separators can be used (such as ion resin flotation separators).

An optional step includes a leach cycle 438. Leach cycle 438 is identical to the leach cycle that has been discussed in conjunction with FIG. 6 and accordingly no further discussion is necessary.

Figure 11:
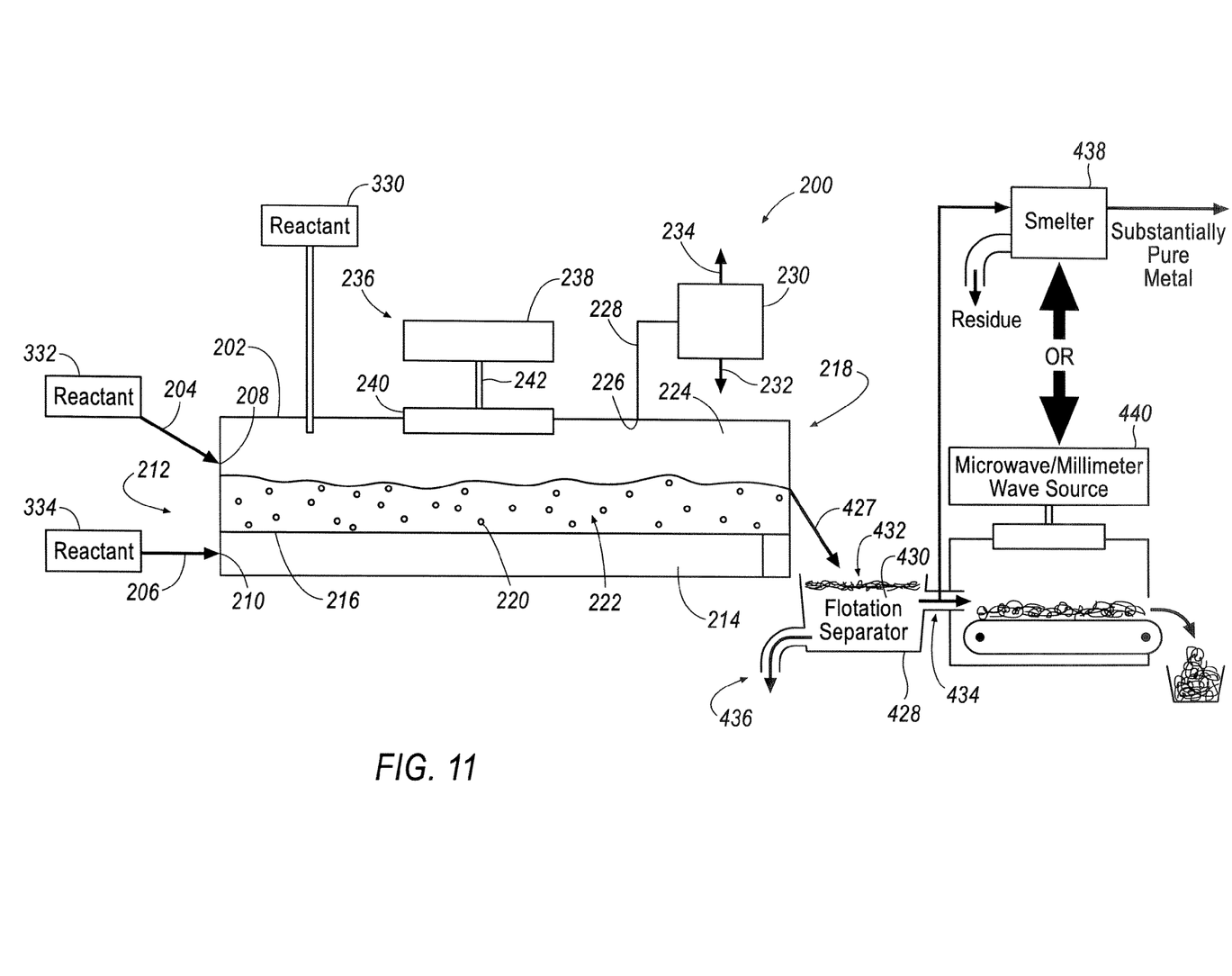

Now referring to FIG. 11, in an alternative embodiment to the system of FIG. 10, everything is identical to that of the system shown in FIG. 10 except that instead of using a leach cycle to purify the particles of interest, either a traditional smelter is used 438 or a microwave/millimeter wave source is used to purify the particles of interested. Both the use of a smelter and the use of a microwave/millimeter wave source for further purification has already been discussed in conjunction with the apparatus of FIG. 7 and accordingly, no further discussion is believed to be necessary. Note that no magnetic separator 244 is present in the embodiment of vessel 202 shown in FIGS. 10 and 11. In these two embodiments, no magnetic separator is needed because the task of separating the particles of interest from the remaining particles is handled by the flotation separator.

Figure 12:
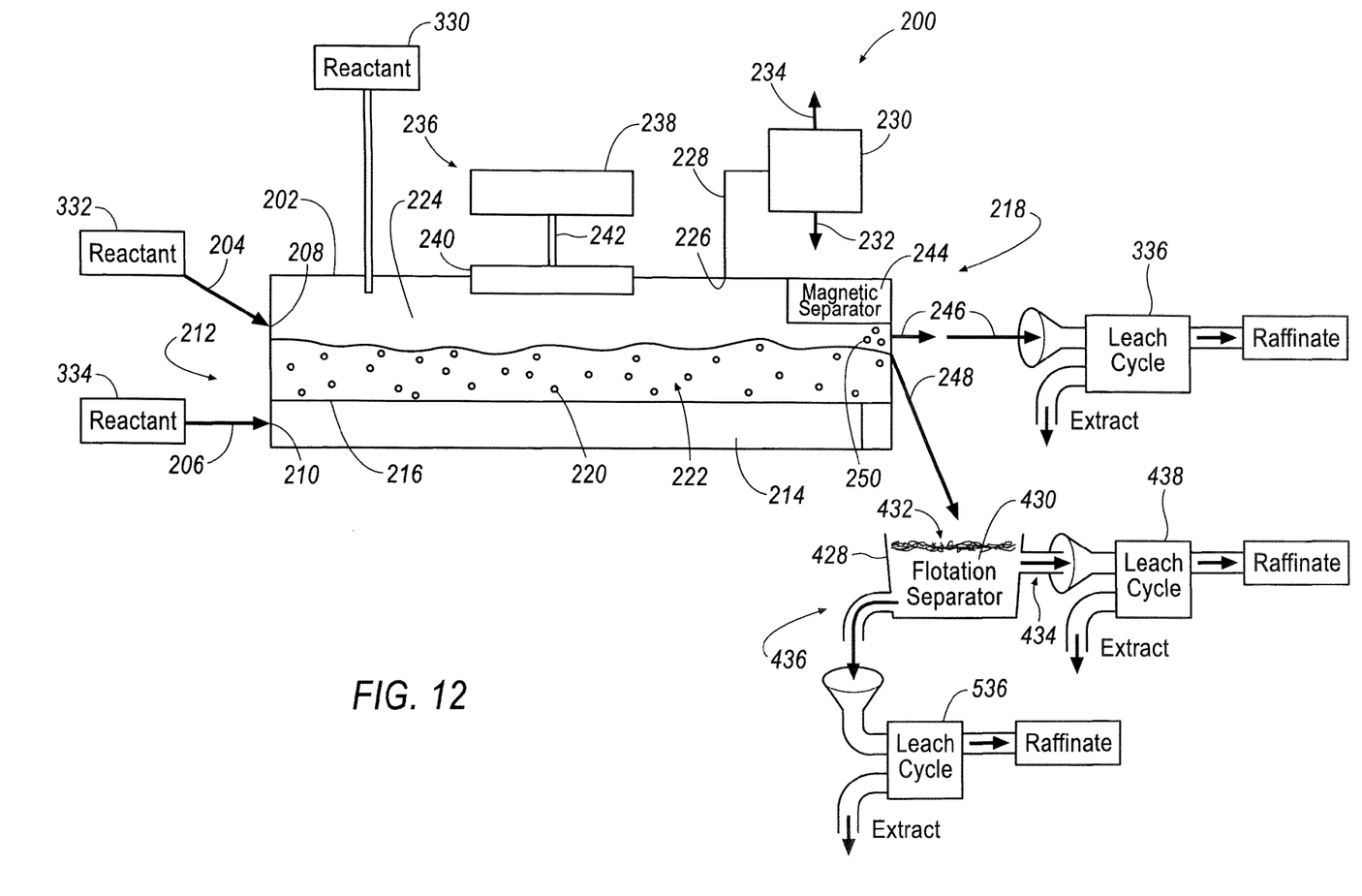
FIG. 12 is a schematic view of the embodiment of FIG. 6 including additional steps for purifying particles having less significant magnetic properties.

Now referring to FIG. 12, apparatus 200 and associated leach cycle 336 is identical to that already discussed in conjunction with FIG. 6. The system of FIG. 12 adds additional processing that of FIG. 6 inasmuch as particles 248 (particles having less significant magnetic properties than particles 246) are processed using flotation separator 432 in combination with leach cycle 438. Although particles 248 are not as rich in metal values as particles 246, particles 248 may contain sufficiently high concentrations of metal values to warrant further processing. The use of flotation separator 432 and leach cycle 438 has already been discussed in conjunction with FIG. 10 and accordingly, it is unnecessary to discuss the process any further. However, an additional step not disclosed in the embodiment shown in FIG. 10 is disclosed in FIG. 12. Specifically, the waste product 436 (i.e. the product that includes a lesser percentage of the particles of interest than that of stream 434) that flows from flotation separator 428 is processed using leach cycle 536. Leach cycle 536 is effective for capturing particles of interest from the waste product of flotation separator 428. These particles of interest would otherwise be discarded if leach cycle 536 was not implemented. Thus, the system shown in FIG. 12 is effective for taking waste product from separator 428 and further processing it using one or more of a flotation separator or a leach cycle to further recover particles of interest from the product stream.

It should be understood that the above description is intended to be illustrative and not limiting. Many embodiments will be apparent to those of skill in the art upon reading the above description. Therefore, the scope of the invention should be determined, not with reference to the above description, but instead with reference to the appended claim, along with the full scope of equivalents to which such claim is entitled. The disclosures of all patents, articles and references, including patent applications and publications, if any, are incorporated herein by reference in their entirety and for all purposes.

What is claimed is:

1. An apparatus for separating components of a mixture of particles, the apparatus comprising:
   a vessel having an interior for containing the mixture of particles during processing,
   an energy system coupled to and disposed within the vessel for directly exposing the mixture of particles within the interior of the vessel to microwave/millimeter wave energy,
   a reactant system for exposing the mixture of particles to a reactant,
   a separator for separating particles, wherein the separator includes
      a first portion arranged within the interior of the vessel, and
      a second portion arranged exterior of the vessel, wherein the first portion includes
         a magnetic separator for diverting magnetic particles away from non-magnetic particles, wherein the second portion includes
         a first exterior separator portion, and
         a second exterior separator portion, wherein the first exterior separator portion includes a leach cycle, wherein the second exterior separator portion includes a flotation separator, wherein the flotation separator separates the magnetic particles into a first group of particles and a second group of particles, wherein the first group of particles are passed to a first leach cycle of the second exterior portion, wherein the second group of particles are passed to a second leach cycle of the second exterior portion.

2. The apparatus of claim 1, further comprising
a gas distributor for contacting the mixture of particles with said reactant.

3. The apparatus of claim 1, further comprising
a gas distributor for distributing said reactant while simultaneously fluidizing the mixture of particles using said reactant.

4. The apparatus of claim 1, wherein said energy system includes
a gyrotron or
a millimeter wave source.

5. The apparatus of claim 1, wherein said reactant system includes a source of at least one of a
sulfur,
a compound containing sulfur,
a halogen containing chlorine or fluorine,
a compound containing halogen, or
a hydrogen gas.

6. The apparatus of claim 1, wherein said vessel is open to atmospheric pressure.

7. The apparatus of claim 1, wherein said vessel is closed to atmospheric pressure and said vessel is operated at a pressure that is greater than atmospheric pressure.

8. The apparatus of claim 1, further comprising:
a conduit having a first end and a second end, wherein the first end of the conduit is connected to the vessel; and
a dust separator, wherein the second end of the conduit is connected to the duster separator, wherein the conduit channels a gas stream from within the vessel into the dust separator, wherein the dust separator removes entrained solids from the gas stream.

* * * * *